UNITED STATES PATENT OFFICE.

LEON GIMENEZ AND JOSÉ YRIGOYEN, OF PAMPELUNA, SPAIN.

COMPOSITION FOR RENDERING WOOD, &c., INCOMBUSTIBLE.

SPECIFICATION forming part of Letters Patent No. 305,174, dated September 16, 1884.

Application filed May 23, 1883. (Specimens.) Patented in France November 6, 1882, No. 151,948; in Italy April 11, 1883, No. 15,456; in Portugal April 12, 1883; in Belgium April 23, 1883, No. 61,197; in Germany April 24, 1883; in Austria April 30, 1883; in England May 5, 1883, No. 2,293; in Russia May 15, 1883; in Sweden May 21, 1883; in Denmark May 24, 1883, and in Norway May 25, 1883.

*To all whom it may concern:*

Be it known that we, LEON GIMENEZ and JOSÉ YRIGOYEN, both citizens of the Spanish Kingdom and residents of Pampeluna, in the Spanish Kingdom, have invented certain new and useful Improvements in Fire-Proof Composition, (for which we have obtained Letters Patent in France under date of November 6, 1882, No, 151,948;) and we do hereby declare the following to be a full, clear, and exact description of the invention, such as will enable others skilled in the art to which it appertains to make and use the same.

Our invention relates to fireproofing composition for combustible substances, and more especially for textiles.

In carrying out our invention we make an infusion of thirty-one (31) grams of the bark of the holly and two (2) grams of sea-salt. After about one hour the liquid is decanted. With one liter of the liquid prepared as above set forth is mixed one hundred and forty (140) grams of sulphate of zinc, one hundred and twenty-five (125) grams of muriate of ammonia, and one hundred and twenty-five grams of alum. This solution is then heated for about four hours, care being taken to avoid ebullition, and two (2) grams of fish-glue or isinglass are added, and the whole stirred until complete solution and intimate mixture of the ingredients have been effected. At the expiration of the four hours, the solution is allowed to cool and passed through a hair sieve, and the incombustible product is completed.

The liquid is applied by means of a brush to the substance it is desired to render fire-proof, and the coating repeated, if necessary, until the said substance is impregnated with the liquid or paint. When applied to the finer textiles or to paper, one or two applications will usually be sufficient to render the same, if not absolutely incombustible, at least non-inflammable, and in practice we prefer to apply a finishing coat or dressing of a gelatinous or glutinous solution to prevent the evaporation of the fireproofing composition.

Besides rendering highly inflammable substances uninflammable, the composition has no deleterious effect whatever upon colors or upon the fibers to which it is applied, both remaining unchanged when applied at the ordinary temperature, while if applied to wood-work, although this will not absorb the liquid so readily and in as great volumes as textiles, yet the protection is complete, since combustion or inflammation will not take place in case of fire, but such wood-work will simply carbonize.

Of course it will be understood that the proportions of ingredients hereinabove given may be varied within certain limits.

Having thus described our invention, what we claim is—

The herein-described fireproofing composition or paint, consisting of an infusion of the bark of the holly and sea-salt mixed with sulphate of zinc, muriate of ammonia, alum, and fish-glue or isinglass, substantially as described.

In testimony that we claim the foregoing we have hereunto set our hands this 28th day of March, 1883.

LEON GIMENEZ.
JOSÉ YRIGOYEN.

Witnesses:
  LA TOUSSAINTE,
  CAMILLE CHARROPPIN.